United States Patent [19] [11] Patent Number: 4,916,850
Dodge [45] Date of Patent: Apr. 17, 1990

[54] LINE ATTACHMENT DEVICE

[76] Inventor: Paul A. Dodge, Rte. 3, Menomonie, Wis. 54751

[21] Appl. No.: 396,071

[22] Filed: Aug. 21, 1989

[51] Int. Cl.⁴ ............................................. A01K 93/00
[52] U.S. Cl. .................................. 43/44.86; 43/44.89; 43/44.91; 43/44.93; 24/115 F; 24/115 M; 24/136 L; 24/136 K
[58] Field of Search ................ 43/44.87, 44.89, 44.91, 43/44.90, 44.93, 44.86, 43.1; 24/115 F, 115 G, 115 M, 136 L, 136 K, 136 R

[56] References Cited

U.S. PATENT DOCUMENTS

| | | | |
|---|---|---|---|
| 1,793,790 | 3/1930 | Fowler | 24/136 L |
| 2,066,049 | 12/1935 | Passek | 24/136 R |
| 2,663,113 | 10/1950 | Tongson | 43/43.1 |
| 3,160,979 | 12/1964 | Bissell | 43/43.1 |
| 3,763,590 | 10/1973 | Meulnart | 43/44.91 |
| 4,473,102 | 8/1984 | Ohman | 24/136 K |
| 4,628,630 | 12/1986 | Bohme | 43/44.93 |
| 4,809,408 | 3/1989 | Abrahamson | 24/115 M |

Primary Examiner—Nicholas P. Godici
Assistant Examiner—Mike Starkweather
Attorney, Agent, or Firm—Burd, Bartz & Gutenkauf

[57] ABSTRACT

A line attachment device for fixing objects to a line such as a fishing line, a string or a piece of rope. The device includes a shank or stem securable to the object to be fixed. The line attaching portion of the device includes a plug fixed to the stem, a cleat next to the plug and extended outward from it, and a cap with a central opening that fits snuggly over the plug. To fix the line to the device, an open loop is formed in the line and is trained through the opening in the cap when the cap is removed from the plug. The loop is drawn over the end of the plug and over the cleat such that it bears against the cleat when pulling toward the plug. The cap is then secured on the plug to hold the loop in place. The loop is secured on the cleat and is prevented by the cap from passing over the cleat whereby the line is secured to the line ataching device and thus to the object. In a preferred embodiment, the objects are paraphernalia for fishing such as a float or bobber, a sinker or weight, a hook or a lure or such things as are commonly fastened to fishing lines.

23 Claims, 2 Drawing Sheets

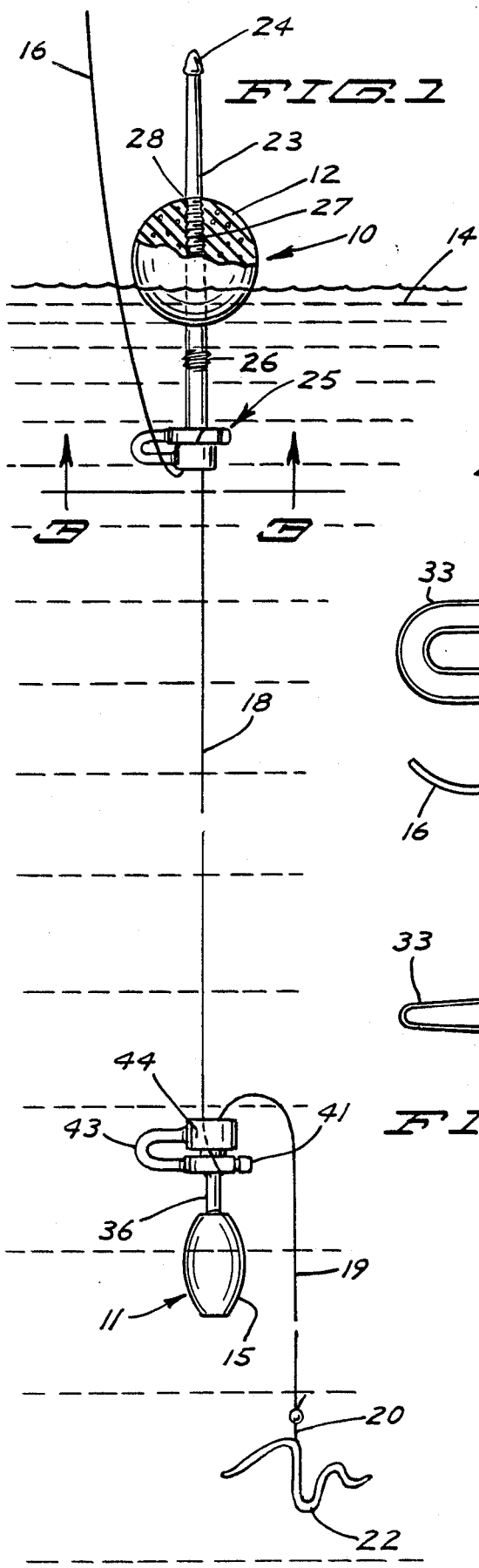

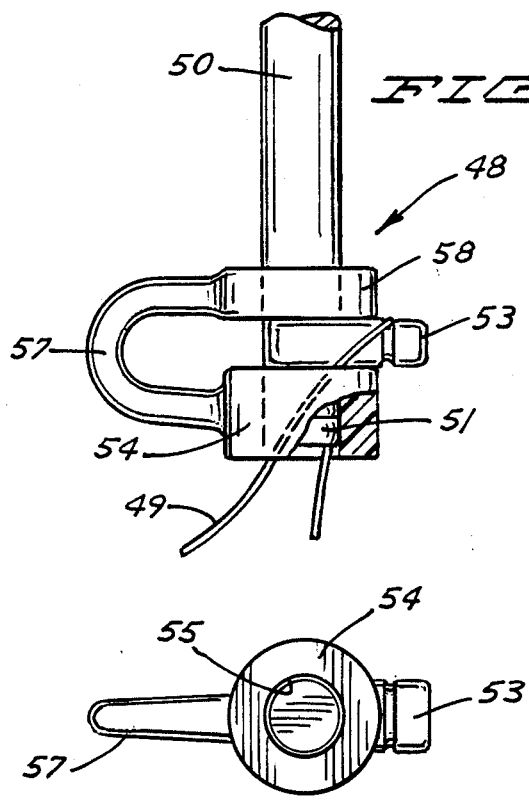
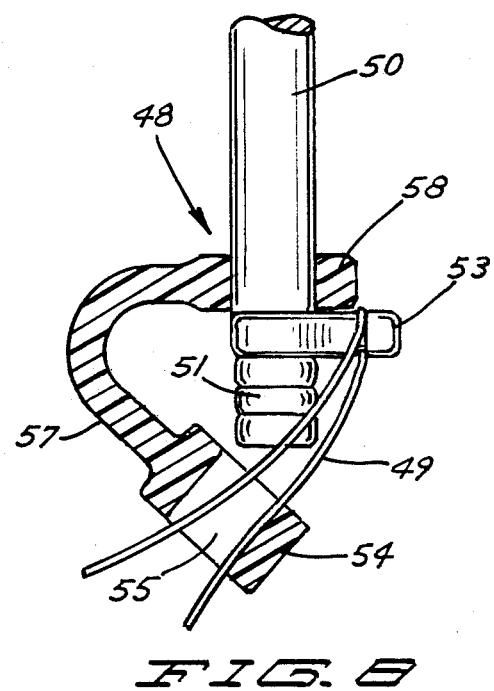
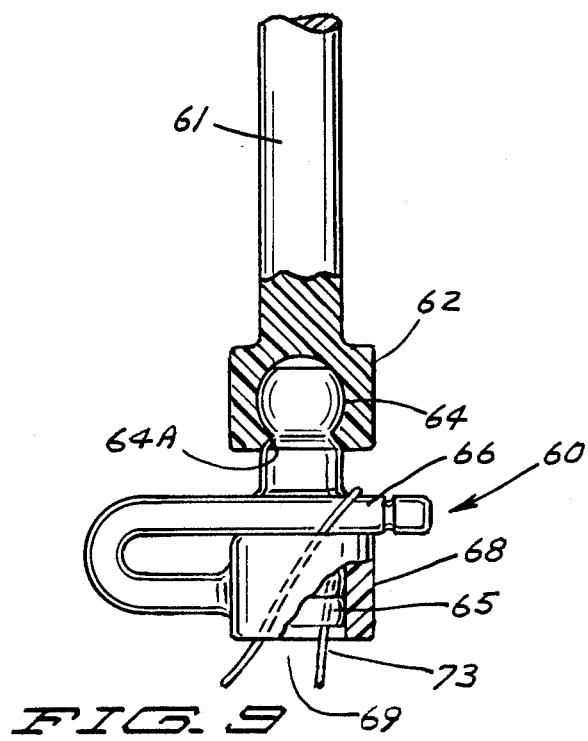
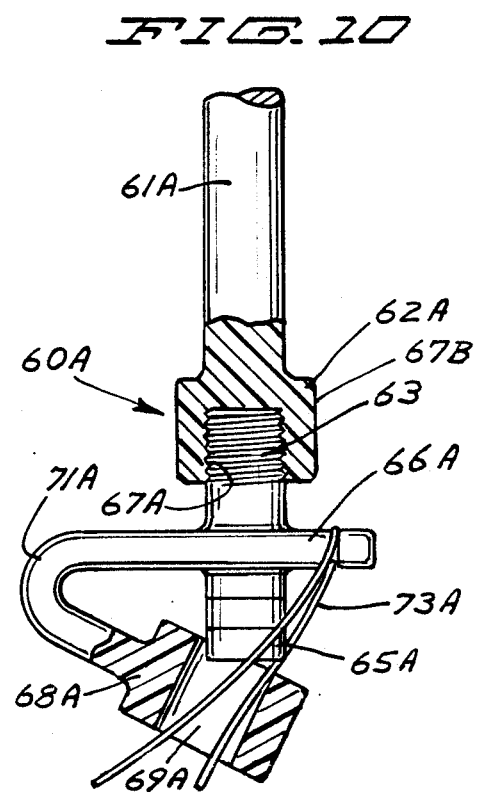

LINE ATTACHMENT DEVICE

BACKGROUND OF THE INVENTION

Various devices are available for attachment of an object to a line such as a rope or string. For example, in the sport of fishing, bobbers, corks and like flotation devices are attached to the fishing line to locate the line in the water and regulate the amount of line beneath the water. These items can have eyes attached to them for forming knots to secure them to the line. Some have various sorts of clips. Weights or sinkers are also attached to the fishing line for the opposite purpose of holding the line beneath the water. Lead weights often have grooves. A segment of the fishing line is fitted in the groove and the metal is deformed over the line to hold it in place.

SUMMARY OF THE INVENTION

The invention relates to a device for attaching objects to a line and is particularly adapted for attachment of fishing line appurtenances such as bobbers, lures, weights and the like, to a fishing line. The device is readily attached and released from the line and is attached to an open loop formed in the line. The device includes a cleat attached to a plug and extending outwardly from the plug, and a cap with a central opening of dimension and shape to frictionally fit over the plug with some small amount of reserve space to permit passage of segments of the line. An elongate stem can extend from the plug and carry the object to be attached to the line. An open loop is formed in the line and is passed through the eye or opening of the cap and over the plug and the cleat. The plug is inserted in the eye of the cap from the direction opposite that through which the loop is trained. The loop is held around the cleat by the cap so that the line is securely fastened to the plug, the cleat and the cap, one of which is in turn fastened to the object to be attached to the line. Typically the object is attached to a shank or stem that extends from the plug in a linear direction. The shank or stem can extend through an opening in the bobber or the sinker or the like. The device is released from the line simply by removing the cap from the plug and releasing the loop from the cleat.

IN THE DRAWINGS

FIG. 1 is a side elevational view of line attachment devices according to first and second forms of the invention in use with respect to a fishing line and fishing line appurtenances;

FIG. 2 is an enlarged view of the working end of one form of the line attachment device of FIG. 1 partly fragmented for purposes of illustration;

FIG. 3 is an end plan view of the first form of line attachment device shown in FIG. 1 taken along the line 3—3 thereof;

FIG. 4 is an enlarged end view of the line attachment device of FIG. 2 showing the cap in an open position for attachment or release of the line;

FIG. 5 is an enlarged side elevation view partly in section showing the second form of line attachment device shown in FIG. 1;

FIG. 6 is a side elevational view partly in section showing one end of a line attachment device according to a third form of the invention;

FIG. 7 is an end view of the line attachment device of FIG. 6;

FIG. 8 is a side elevational view partly in section showing the line attachment device of FIG. 6 but with the cap in the open position;

FIG. 9 is a side elevational view partly in section showing the end of a line attachment device according to a fourth form of the invention; and FIG. 10 is a side elevational view partly in section of another form of the line attachment device of the invention with the cap partly open.

DESCRIPTION OF PREFERRED EMBODIMENTS

Referring to FIG. 1, there is shown a line attachment device 12 indicated generally at 10 according to a first form of the invention as well as another line attachment device indicated generally at 11 according to another form of the invention. The line attachment device 10 is fixed to a flotation device or bobber 12 which suspends it above the surface of a body of water 14 for fishing purposes. The second line attachment device 11 is connected to a sinker or lead weight 15 which is meant to have the opposite effect, namely that of holding the line segment beneath the surface of a body of water 14. A fishing line 16 is connected to the first line attachment device 10. A segment 18 of the fishing line 16 extends from the line attachment device 10 at the surface of water 14 downwardly under the influence of the weight 15 to the second line attachment device 11. Another segment of fishing line 19 extends from the line attachment device 11 and carries a hook 20 which in turn carries a fishing bait or worm 22 for use in the sport of fishing. Use of the float 12 connected to the line attachment device 10 and the sinker 15 connected to the line attachment device 11 regulates the depth of the bait 22 and locates the line 16, 18, and 19 in the water. The fishing line 16, 18, 19 is readily attached to the line attachment devices 10, 11 for purposes of organized and efficient preparation for fishing. The line is readily released from the attachment devices when desired. When properly fixed to the line attachment devices, the fishing line is not easily dislodged therefrom.

With more specific reference to the first line attachment device 10, and also with reference to FIGS. 2 through 4 as well as FIG. 1, the device 10 includes an elongate shank or stem 23 having a far end terminating in a point 24 and an opposite end 25 for line attachment. The intermediate portion of the shank 23 has a series of ribs or crested ridges 27. The float 12 can be of a soft material such as expanded foam having a central opening 28 corresponding in a diameter to that of an intermediate segment of the shank 23. The shank 23 passes through the opening 28 to a point where the ridges 27 engage the side surfaces of the hole 28 to hold the float 12 on the shank 23. Shank 23 also has optional threads 26 for engagement of objects to be attached to line 16.

Fishing line 16 is attached to the line attachment end 25 of the line attachment device 10. The line attachment end 25 terminates in a cylindrical plug or stub end 29. A cleat 31 extends perpendicularly from the plug 29. Cleat 31 can be attached to a collar 30 disposed in surrounding relationship to the shank 23 and fixed thereto by suitable means such as glue. The collar 30 divides the remainder of the shank 23 from the plug 29 and provides a stop for a cap 32. Cap 32 has a cylindrical central opening 35 of a dimension and shape to snugly fit over the plug 29. Cap 32 is attached to the shank 23 as by an arm 33 which connects the cap 32 to the collar 30. Cap 32 is readily insertable and removeable from the plug 29 upon digital action by the user. The shank, cap, arm and cleat can be a single piece formed of injectable rubber.

Upon the procedure of attaching a segment of line 16 to the line attachment device 10, cap 32 is released from plug 29 as shown in FIG. 4. A loop 17 is formed in the line 16 and is passed through the opening 35 of cap 32 from a direction opposite plug 29. Loop 17 is then trained over the plug 29 and the cleat 31. It is snuged up against the cleat 31 and the cap 32 is replaced on the plug 29 as shown in FIG. 2. The cap 32 frictionaly restrains the line 16 with respect to the post or plug 29 preventing expansion of the loop 17 of sufficient dimension to enable it to pass back over the cleat 31. Pressure or tension on the line 16, 18, like that shown in FIG. 1 simply bears against the cleat 31 and does not tend to open the cap 32. Fastening device 10 is effective to securely fasten the float 12 to the line 16. In order to dislodge the line 16 from the fastening device 10, cap 32 is removed from the post 29, whereby the loop 17 is expanded to the point where it is moved back over the cleat 31 and back through the opening 35 of cap 32.

The line attaching device according to a second form of the invention is shown in FIGS. 1 and 5. Line attaching device 11 includes and elongate linear shank or stem 36 having a tappered and threaded far end 37 and a line attachment end 38. The end 37 is provided with a screw thread which is threadably engaged in a central opening 39 provided in the sinker or weight 15. Weight 15 can be comprised of a soft material such as lead whereby the treads 37 can be self threading into the hole 39 to be securely engaged therein. A leader 34 can be used to secure threaded end 37 in the opening 39. The opposite end or attachment end 38 of the shank 36 has a head or stub end 40. A cleat 41 extends outwardly from a collar 42 that surrounds the shank 36 next to the head 40. An arm 43 connects to a cap 44 having a central openning 45 as described with respect to the embodiment of FIGS. 2 through 4. A loop 46 of a fishing line is trained through a central opening 45 of cap 44 and looped around cleat 41. With the cap 44 in place on the head 45, the loop 46 is held securely in place. The fastener 10 is readily attached to many standard forms of fishing weights that are provided with interior openings. The threaded end 37 can be formed of a relatively hard material whereby the end can be threaded into any number of types of materials to be attached to a fishing line or other such line.

FIGS. 6 through 8 illustrate yet a further form of attachment device having an attachment end wherein the cleat is fixed to the shank or post, and the cap is removably assembled to the post. This permits use of a post of hard plastic or other hard material such as a spike or a nail. The hard plastic can have ribs or screw threads for engagement with other hard surfaces. The attachment device indicated generally at 48 is attached to a line 49 and has a linear shank 50 of hard plastic or other hard material. The shank 50 has a stub end or plug end 51. The shank 50 is connected to any such item (not shown) as it is desired to have assembled to the line 49 such as a fishing bobber or sinker in the case of the sport of fishing. Attachment device 48 is useful for attaching other items to a line particularly where it is desired to attach the item to an intermediate section of the line by simply forming a loop.

Device 48 includes a cleat 53 intregral with and extending outward from the shank 50 in perpendicular relationship to the longitudinal axis of the shank 50. The cleat 53 is located at the inside end of the plug end 51. A cap 54 has a central opening 55 of a dimension and shape to snuggly fit over the plug 51 with a line loop 49 trained therein and engaged with the cleat 53. A Cap 54 is connected by a flexible arm 57 to a collar 58 that slideably engages the shank 50 on the opposite side of the cleat 53 from the stub end 51. The collar 58 is slideable over the opposite end of the shank 50 (not shown) to a point of engagement or abutment with the cleat 53 where upon the cap 54 is engageable with the plug 51. Cap 54 is removable from the shank 50 independently of the cleat 53. This can be done for purposes of replacement of the cap 54 or simply for use of the shank 50 and cleat 53 without the cap. It also permits use of a hard plastic shank while the arm 57 and cap 51 are necessarily of a softer material in order to be flexible.

FIGS. 9 and 10 illustrate further forms of line attachment device according to the invention for quick connection and disconnection of objects from a fishing line. For example, a larger float can quickly be installed in place of a smaller one if needed. A line attachment device indicated generally at 60 in FIG. 9 is installed on a shank 61 having a cupped end 62 for a ball and socket type connection. Shank 61 or cup 62 can be connectable to an object to be fixed to the line such as a float or a weight. Attachment device 60 includes an extension member or ball 64 which is positionable inside the opening or socket of the cup 62 in a friction fit or snap-fit relationship so as to be readily connected and disconnected. The curvature of ball 64 corresponds to that of socket 62. Both have a corresponding neck restriction at 64A whereby the ball 64 snaps in and out of the socket of cup 62 for quick attachment and release. Attachment device 60 includes a plug or stub end 65 connected to the insert 64 and a cleat 66 extended outward from the longitudinal axis of the plug end 65. Cleat 66 is located at the juncture of the plug end 65 and the insert portion 64. A cap 68 has an opening 69 for snug receipt and fitting upon the plug 65. A flexible arm 71 connects the cap 68 to the cleat 66.

Line attachment device 60 functions as earlier described except that it is readily removeable with respect to the shank 61. The cap 68 is removable from the plug 65 whereby a line loop 73 is trained through the opening 69 and around the cleat 66. With the loop 73 so positioned, the cap 68 is placed over the plug 65 whereby the line 73 is held securely in place. Tension placed on the line 73 does not tend to release the cap 68. The object can be attached to the line loop before threading it through the cap, or it can be fixed to the member 64 by a cup connection, or it can be fixed to the shank 61.

Another form of quick release line attachment device is shown in FIG. 10 which is exactly the same as that shown in FIG. 9 with the exception of having a threaded connection instead of a ball and socket connection between the shank and the attachment portion. The shank is devised for quick disconnect as by a fisherman quickly changing a float or a sinker. The attachment device 60A is installed on a shank 61A equipped with an outwardly open end cup 62A for receipt of a connecting member 63 in close friction relationship or, as shown, in screw-threaded relationship. Member 63 has exterior threads 67B which mate with interior threads 67A in the cup 62A.

A stub end 65A is connected to insert 63 and a cleat 66A extends outward. A cap 68A is connected by a flexible arm 71A to the insert member 63 and cleat 66A.

A line loop 73A is trained through cap opening 69A and is placed around cleat 73A. Replacement of cap 68A secured line 73 to shank 61.

While there have been shown and described certain preferred embodiments of the invention, it will be apparent that deviations can be had therefrom without departing from the scope and spirit of the claims.

The embodiments of the invention in which an exclusive property or privilege is claimed are defined as follows:

1. A line attachment device for attachment of an object to a line segment formed into an open loop, comprising:
   a plug;
   a cleat attached to one end of the plug and extended outwardly from the plug;
   a cap having a central opening with a dimension and shape to fit over the end of the plug opposite the cleat in snug relationship whereby an open loop can be formed in the line segment and trained through the opening in the cap from a direction opposite the cleat, and trained over the plug and the cleat whereby the cap can be positioned on the plug to secure the line segment with respect to the plug, the cleat and the cap; and
   means for connecting said object to said plug.

2. The line attachment device of claim 1 wherein: said plug is cylindrical, said opening in the cap is cylindrical, and a shank that is connected to the plug opposite the cleat for connection to said object.

3. The line attachment device of claim 2 including: a flexible arm connecting the cap to the plug.

4. The line attachment device of claim 2 wherein: said shank is cylindrical, said cleat is integrally connected to the shank and extended outward therefrom in perpendicular relationship to the longitudinal axis of the shank, a collar that is slideably mounted on the shank opposite the plug with respect to the cleat, and an arm connecting the collar to the cap.

5. The line attachment device of claim 2 wherein: said shank has a series of threads on an end for threaded engagement of the object to be fixed to the line.

6. The line attachment device of claim 2 wherein: said shank has a series of ribs located intermediate the length thereof for holding said object by engagement in a central opening thereof.

7. The line attachment device of claim 1 wherein said device is connectable to a holder having a shank and an open cup with a pocket and including: an insert member fixed to the plug on the opposite side of the cleat and having a dimension and shape for snug friction fit into the pocket of the cup.

8. Fishing line attachment comprising:
   an elongate shank having a cylindrical plug formed at a first end thereof and a cleat secured to the shank adjacent the plug spaced from the first end and extending outward therefrom a short distance generally perpendicular to the shank;
   a cap having a central opening corresponding in size and shape to the plug whereby the cap is insertable over the plug and frictionally retainable whereby an open loop of a fishing line segment can be inserted through the cap opening from a direction opposite the plug and then trained over the plug and the cleat to be retained thereon by installing the cap over the plug end, and
   means for fixing an item of fishing paraphernalia to the shank.

9. The fishing line attachment of claim 8 including: an item of fishing paraphernalia attached to the shank and comprised as a float device.

10. The fishing line attachment of claim 9 wherein: said float device has a central opening, said shank having ribs formed at an intermediate location along the length thereof, said shank is installed in the central opening of the float device with said ribs frictionaly retaining the shank with respect to the float device.

11. The fishing line attachment of claim 10 including: an arm connecting the cap to the shank.

12. The fishing line attachment of claim 8 including: an item of fishing paraphernalia attached to the shank and comprised as a weight.

13. The fishing line attachment of claim 12 wherein: said shank has a threaded tip at a second end thereof, said weight having an opening said threaded tip being threadably engaged in said weight in said opening thereof.

14. The fishing line attachment of claim 13 including: a flexible arm connecting the cap to the shank.

15. The fishing line attachment of claim 8 including: a flexible arm connecting the cap to the shank.

16. The fishing line attachment of claim 15 including: a loop of a fishing line trained through the opening in the cap and over the plug end and over the cleat with said cap installed on the plug such that the tension force on the fishing line causes the fishing line to wear against the cleat.

17. A quick release line attaching device comprising:
   a first part having means for connection of an object to be attached to a line, and having a first connecting end;
   a second part carrying a releasable line attaching means and carrying a second connecting end;
   said releasable line attaching means including a plug, a cleat attached to one end of the plug and extended outwardly from the plug, said second connecting end being connected to the cleat, a cap having a central opening with a dimension and shape to fit over the end of the plug opposite the cleat in a snug relationship whereby an open loop can be formed in a segment of a line and trained through the opening in the cap from a direction opposite the cleat, and trained over the plug and cleat whereby the cap can be positioned on the plug to secure the line segment with respect to the plug, the cleat and the cap;
   one of said connecting ends being comprised as an open-ended cup;
   the other of said connecting ends being comprised as a member insertable in the open-ended cup, and means for retaining the member in the cup.

18. The quick release line attaching device of claim 17 wherein:
   said first and second connecting ends are comprised as a ball and socket connection.

19. The quick release attaching device of claim 17 wherein:
   the connecting end having the outwardly open cup is comprised as a socket having a curved cup with a restricted neck opening, said member on the other connecting end comprised as a ball shaped member for connection by a snap-fit into the cup.

20. The quick release line attaching device of claim 19 wherein: said means on the first part for connection to an object is comprised as an elongate shank.

21. The quick release line attaching device of claim 17 wherein: said cup has interior threads, said insertion member having exterior threads for threadable connection to the cup.

22. The quick release line attaching device of claim 21 wherein: said means on the first part for connection of an object is comprised as an elongate shank.

23. The quick release line attaching divice of claim 17 wherein: said insert member is of a shape and dimention for snug frictional fit in the cup.

* * * * *